Patented July 28, 1936

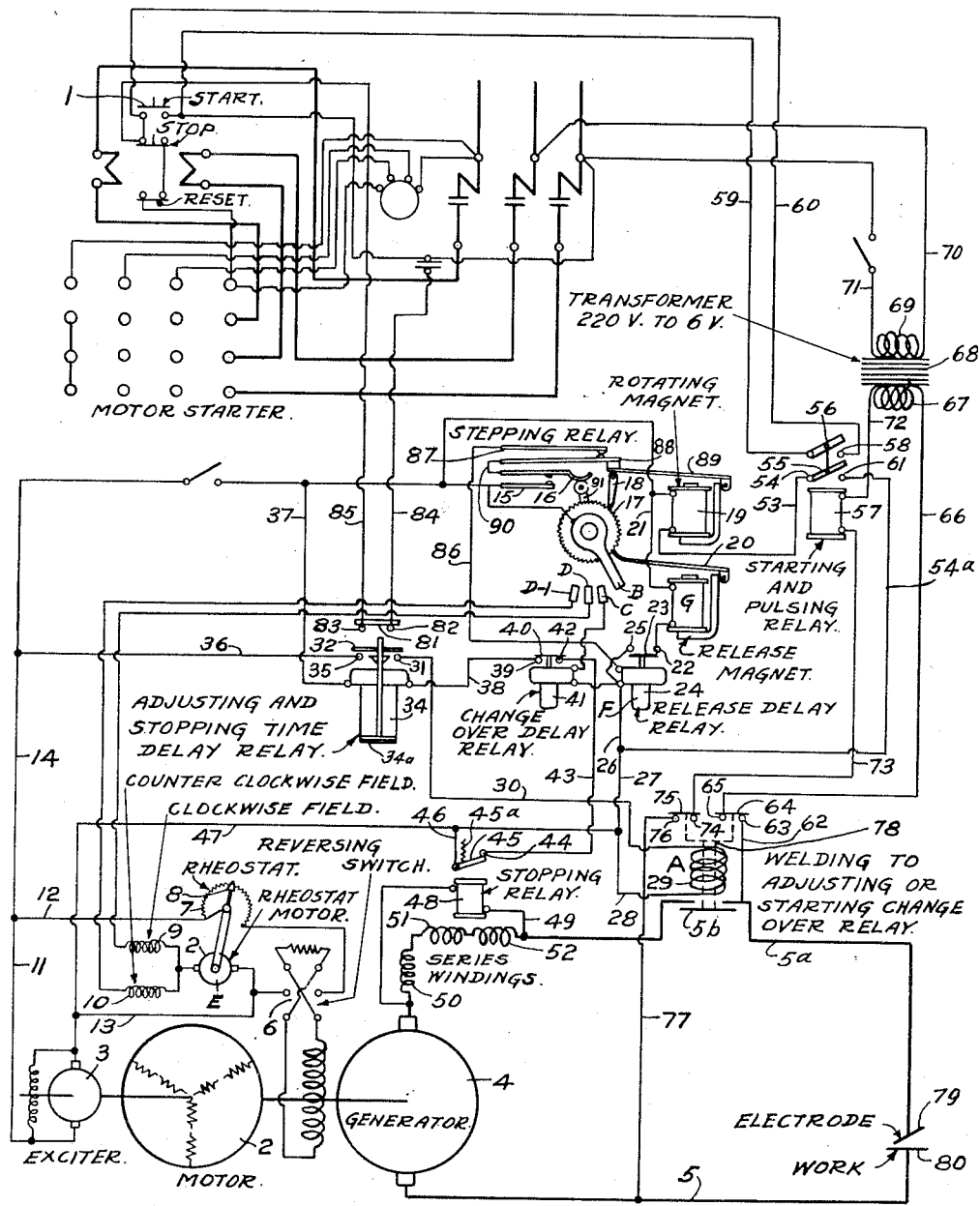

2,049,377

UNITED STATES PATENT OFFICE 2,049,377

ELECTRIC WELDER CONTROL

Edward A. Hobart, Troy, Ohio

Application January 9, 1935, Serial No. 1,033

13 Claims. (Cl. 219—8)

It is the object of my invention to provide a control of an electric welder by the application, usually remote from the machine, of the electrode to the work.

It is a further object to effect this control both for closing the welding circuit and for determining the amount of voltage utilized in the welding circuit by the number of taps or applications of the electrode to the work, the duration of the taps, and the duration of the interval between taps prior to the final application of the electrode to the work for welding at the predetermined selected voltage.

It is particularly the object of my invention to provide for such a control through a control circuit interconnected with the welding circuit but separately supplied with electrical energy and entirely independent of the welding circuit except for control purposes and for the utilization of a common interconnecting switch, common portions of the two circuits and the common electrode and work in the two circuits.

It is an object of my invention to thereby eliminate the external arcing circuit, as well as the arc welding generator, from the control or signalling circuit and to supply my separate signalling circuit or control circuit with a separate source of electrical energy entirely independent of the arc welding circuit. This improvement entirely eliminates the spotting of the work. Heretofore circuits that have employed the external arcing circuit as a control circuit and the current from the welding generator as the control current have been found objectionable because the work was spotted due to the fact that every time the electrode tapped the work with a high current flowing through it, there was a big flash, and as it took a number of taps to move the adjustable field rheostat, there was considerable spotting of the work.

By employing the low voltage on the control circuit and the high voltage on the welding circuit, the respective functions of welding and control are separated and this spotting does not occur.

Figure 1 is a diagrammatic view of the circuits and apparatus of my invention.

Figure 2 is a time guide showing the time of application and the time between applications when the electrode is used for closing the welding circuit and then is reapplied for the welding operation.

Figure 3 is a similar diagram showing the time of application and the time between applications of the electrode for first closing the welding circuit, then adjusting the voltage to be used on the welding circuit upwardly, and then applying the electrode for welding.

Figure 4 is a similar diagram showing the time interval of application of the electrode, time intervals between applications of the electrode and the final application of the electrode for welding when the voltage is adjusted upwardly and then downwardly if it has been adjusted upwardly too far and too much voltage has been provided for.

When it is desired to start welding, the welding circuit is disrupted because the no voltage relay or circuit selecting switch A has become de-energized and the circuit is open. Upon the operator touching the electrode to the work and immediately removing it and holding it in a removed position for a short interval of time, the time relay will cut out the control circuit and the no voltage relay or circuit selecting switch A will close, and thereupon the operator will place the electrode back on the work and continue working to weld. This operation has moved the finger B onto the first contact plate C, where it remains.

If, however, the operator wants to increase the voltage for welding, he first taps the work lightly and then quickly taps the work a second time. The second tap is held on the work, with the result that the rotary switch arm B engages with the contact D and the length of time he holds the second tap will determine how long the rheostat motor E will turn the rheostat for increasing the voltage, and will determine the amount of voltage that is to be used in the subsequent welding operation. Then the operator lifts the electrode and holds it off long enough for the release relay F in connection with the release magnet G to return the rotary switch arm B to its initial position. He then restores the electrode to the work, which brings the rotary switch arm B onto the contact C, and the welding will continue at the voltage amount as determined by this operation.

General operation

The start button 1 is pushed closed, which connects the three-phase A. C. current to the motor 2. This motor has a separately excited field excited by the exciter 3. Upon doing this, the motor drives the generator 4. The generator 4 is provided with an external arcing or welding circuit 5 which has a no-voltage relay switch A in circuit with it. The generator is provided with a field reversing switch 6 in order to change the polarity for different types of electrodes. This reversing switch is in circuit with the rheostat 7. The rheostat 7 is provided with a moving contact finger 8 which is actuated by the motor E as hereinafter described. This motor E is adapted for moving in either direction, having a clockwise field 9 and a counter-clockwise field 10. These fields are connected in series and terminate in the terminal plates D and D—I as hereinafter described. The rheostat is in series with the generator field, the reversing switch 6 and the separate exciter 3 through the lines 11, 12 and 13. The separate exciter line 14 connects the lines 11 and 12 with the rotary ratchet switch arm B. The line 14 is also connected to the contact finger 15, and through the latter to the finger 16 on the rotary ratchet 17 which carries the rotating contact arm B. The rotary ratchet 17 is actuated by a pawl 18 which receives its movement from a ratchet rotating magnet 19 which is connected by the line 21 to a release magnet G. The release magnet G has its armature 20 arranged as a stopping finger. Beyond the magnet G, the line 21 continues to a connection with the separate exciter line 14. The release magnet G is connected at the other end to the switch terminal 22, the latter being engageable by the release delay time switch blade 23 operated by the coil 24 of the release delay relay F. This engagement serves to connect the terminal 22 to the terminal 25. Terminal 25 is connected through the line 26, line 27 and line 28 to the solenoid coil 29 of the circuit selecting switch or no-voltage relay A, the other side of which is connected by the wire 30 to the terminal 31 engaged by the switch blade 32 of the adjusting and stopping time delay relay 34. The other side of the switch 32 is connected to the terminal 35, wire 36, and thence to the separately excited line 14. The relay 34 has its coil connected on one side by the wire 37 to the line 14 and on the other side by the wire 38 to the terminal 39. The terminal 39 is bridged by the switch blade 40 of the change-over delay relay 41. The switch blade 40 is connected thereby to the terminal 42 and thence to the wire 43, which terminates at 44 as the terminal for a swinging switch arm 45 of the stopping relay 48, the other end of which arm is connected to the wire 46. The wire 46 is connected by the wire 47 to the other side of the exciter 3. This switch 45 is actuated by a stopping relay 48 which is in a shunt circuit 49 around the interpole and diverter pole windings respectively designated 50, 51 and 52, 50 being the interpole winding and 51 and 52 being the diverter poles. This stopping relay 48 provides for de-energizing the control circuit during the period that the welding operation is continuing, and upon stopping of the welding operation and the use of the control circuit then being desirable, the stopping relay 48 releases this switch 45, permitting it to close on the terminal 44. This is accomplished by the spring 45a normally pulling the switch to its closed position when the coil 48 is de-energized due to the stopping of the welding operation.

Returning to the release magnet G and the rotating magnet 19, it will be noted that the wire 21 which is connected to each of these magnets is also connected to the separately excited line 14. The other side of the rotating magnet 19 is connected by the wire 53 to the terminal 54 and switch blade 55. The switch blade 55 is connected to a pivoted switch blade 56. Both of these blades are adapted to be operated simultaneously when the starting and pulsing relay 57 is energized as hereinafter described.

When the starting and pulsing relay coil 57 is so energized, the switch blade 56 engages the terminal 58 and brings into circuit the lines 59 and 60. Likewise the blade 55 engaging the terminal 61 brings in circuit the lines 53 and 54a. Line 54a is connected into the juncture of the lines 26 and 27. The energization of the coil 57 is effected by the control circuit of which the coil 57 is a part. This control circuit consists of the line 62, which is connected at 63 to the external arcing circuit 5 and 5a. The line 62 has a terminal 63 which is bridged by the switch blade 64 that joins the other terminal 65 at the end of the line 66. The line 66 includes the secondary 67 of a small transformer generally designated 68, the primary of which 69 is in the circuit designated 70 and 71 that is connected to the main three-phase alternating current circuit.

Returning to the secondary 67 of the transformer 68, it will be noted that it is connected by the wire 72 to the coil 57. The coil 57 is connected by the wire 73 to the terminal 74. This terminal is connected by the switch blade 75 to the terminal 76, which is in turn connected by the wire 77 to the other side of the arcing circuit 5. The two switch blades 64 and 75 are connected to the solenoid core 78 of the solenoid coil 29 of the circuit selecting switch or no voltage relay A. When this coil 29 is de-energized, the switch blade 5b drops, opening the line 5a and thereby opening the external arcing circuit, rendering it inoperative. The opening of 5b results in the closing of the control circuit, which is composed generally of the line 66, secondary 67, line 72, coil 57 and line 73 so that the control circuit is then supplied with a step-down alternating current for the purpose of actuating the several parts as hereinafter described for control purposes.

The electrode 79 may be of any desired character. 80 designates the work.

In ordinary welding operation, the generator 4 supplies the welding current for the electrode for the welding operation. The function of the no-voltage relay or circuit selecting switch A is to permit the disruption of the welding circuit. When the welding operation has ceased by withdrawing the electrode and that cessation has continued over a continuous period of, for instance, 16 seconds, then the no voltage relay or circuit selecting switch A becomes de-energized and the switch blade 5b opens the circuit 5a and closes the control circuit. This de-energization of the no voltage relay A a predetermined period of time after the cessation of welding is effected by the adjusting and stopping time delay relay 34 in the following manner.

When the operator stops welding by withdrawing the electrode 79 from the work 80, the stopping relay 48 is de-energized. That permits the spring 45a to pull switch 45 into contact with the terminal 44, thereby bringing into circuit the line 47 and 46, switch arm 45, terminal 39, line 43, terminal 42, blade 40, line 38, coil of the time delay relay 34, line 37, line 14, line 11, back to the separate exciter 3. This serves to energize the coil of the adjusting and stopping time delay relay 34 to open the circuit 47, line 28, solenoid coil 29 of the circuit selecting switch or no-voltage relay A, line 30, terminal 31. switch blade 32, terminal 35, line 36, line 14 and line 11 back to the separate exciter. The normally closed switch 32 is thus moved to its open position. The adjusting and stopping time relay 34 has a dashpot 34a for regulating the time of movement of its switch blades 32 and 81. After 15 seconds, the switch blade 32 is moved to open position and after a minute of delay, during which minute the welding circuit is open, the switch blade 81 is moved from closed to open position and is removed from the terminals 82 and 83 in the lines 84 and 85. This disconnects the whole machine from the source of power in order to save power.

It will be noted that the release delay relay F is connected by the line 86 to the contact finger 87 which is associated with a stepping relay 90. This finger 87 is engaged by the finger 88 which is connected to the armature 89 of the ratchet rotating magnet 19 in association with the pawl 18. The finger 88 is connected therebeneath to the finger 16 that is in engagement with the arm 91 associated with the rotating ratchet 17.

The function of the normally-open release delay relay F, which has a dashpot, is to hold the switch blade 23 in its open position for a predetermined period after its energization as desired, such as two seconds, and delay its closing, because when it closes it will energize the release magnet G and draw the stopping finger 20 downwardly, releasing the ratchet 17, and it is desired not to release this ratchet when the finger B is in contact making position for at least two seconds after the welding circuit has been opened.

This is for the purpose of having one magnet inoperative while the other is operating. I am referring to release magnet G and rotating magnet 19.

The function of the normally-closed changeover delay relay 41 with its associated dashpot is to maintain the circuit closed and delay its opening for a predetermined period after its energization for at least one second so that if it is desired to shift the rotating contact arm B from one contact such as C to the contact D or D—1, the operator has at least a second to do so before the circuit is broken between the terminals 39 and 42. When the circuit is broken, then the adjusting and stopping time delay relay 34 is deenergized, closing the switch blade 32 on contacts 31 and 35 and also closing the switch blade 81 on contacts 82 and 83.

The control circuit heretofore described can be used both for starting as well as for regulating the quantity of welding current. The switch blade 55 is the regulating switch and switch blade 56 is the starting switch, these being associated with the starting and pulsing relay 57.

Accordingly, instead of using the start button 1, which may be remote from the point where the welding is taking place, the welder may start the welding apparatus merely by touching the electrode 79 to the work 80 with a single tap. This shifts the rotary contact arm B to engage the first contact C. After lifting the electrode he waits two seconds, which gives the machine a chance to start up because the control circuit has thus been energized and the starting switch 56 has been closed. If the operator does not do anything more within the next thirteen seconds, or a total of fifteen seconds from the time he first tapped the work, then the switch 5b which is now closed will drop open due to the action of the adjusting and stopping time delay relay 34. Therefore, the operator restores the electrode to the work before the fifteen seconds are up and will continue his welding operation with whatever amount of current the machine has been previously adjusted. This adjustment is hereinafter described.

In order to adjust the amount of current that the operator may desire for his welding operation of my invention, he may follow the following procedure.

He taps the work for a brief interval, which is substantially instantaneous, of approximately one second. He then quickly taps the work a second time in a period between taps of less than two seconds. He allows the electrode to remain on the work during this second tap a period sufficient to adjust the machine to give him the amount of voltage he desires. When this has been accomplished, he then lifts the electrode from the work and immediately restores it, continuing the welding operation. This second lifting is for the purpose of terminating the adjustment of the amount of voltage required which is determined by the position of the rheostat 7 as operated by the motor E (Figure 3).

Now, referring to what takes place during the second tap for adjusting the quantity of current that is to flow for the welding operation, during this tap the rotary contact arm B, which is already moved to contact C due to the first tap of the electrode on the work, will move over to contact D, which is brought about by the second tap.

In the event the operator has more current than he desires and he wants to reverse the rheostat to reduce the amount of current (Figure 4), he will give a third tap before starting his welding operation in order to bring the finger B onto the contact D, and he holds the third tap long enough for the motor E to move the rheostat finger 8 to a point to get the exact amount of current desired. He then quickly removes the electrode from the work and restores it to the work immediately thereafter to continue the welding operation.

The essential features of this invention are the following:

(a) A welding circuit having a no-voltage relay disrupting switch and a control circuit separately supplied with current only from the main supply line, which has nothing to do with the generator circuit. The control circuit is only in operation when the welding circuit is open and vice versa.

(b) An adjusting and stopping time delay relay 34 which disrupts the welding circuit and brings into play the control circuit if the electrode is off the work more than fifteen seconds and which is adapted, if the electrode is off the work over a minute to cut off the power and save the power.

(c) Rheostat adjustment, either electrical or manual, for adjusting the amount of welding current, either increasing or decreasing it according to the period that the electrode is held on the work when the apparatus is being adjusted.

(d) The first brief tap of the electrode on the work connects the control circuit through switch 56 to the source of power, and through switch 55 moves rotary contact arm B onto the contact C and starts the cycle of operations through the adjusting and stopping time delay relay 34 by dropping the core of solenoid 34. This closes the circuits heretofore described, which results in the energization of the no voltage relay A and the closing of the welding circuit.

(e) The interval between tap one and the second tap must be sufficient to exceed the fifteen seconds necessary to drop out the core and switch of solenoid A and let arm B return to its initial position. The second tap is held long enough thereafter for arm B to move to contact D and held long enough on contact D to permit the rheostat to be adjusted for the quantity of welding current desired.

(f) The third tap must not be delayed more than one second if it is desired to have arm B travel from contact D to contact D—1. The purpose of travelling to contact D—1 is to reverse the motor E and adjust the rheostat for a decrease in welding current if you have got too much. If the operator waits more than one second for his third tap, arm B will go back to zero position as indicated.

When the operator goes from the second tap to the welding operation or from the third tap to the welding operation, he must delay at least two seconds to allow arm B to go back to its homing or initial position before he restores the electrode to the work and continues the welding operation with the amount of current to which its system has been so adjusted.

It will be understood that I desire to comprehend within my invention such modifications as come within the scope of my claims and my invention.

Having thus fully described by invention, what I claim as new and desire to secure by Letters Patent, is:

1. In a motor generator welding set having a separate exciter, a supply circuit to the motor generator, a welding circuit supplied by the generator having an electrode and work piece therein, a welding control circuit connected with the welding circuit, a circuit selecting switch for the welding and welding control circuits, and means controlled by the application of the electrode to the work for operating the selecting switch to render the welding circuit operative and concurrently to render the control circuit inoperative.

2. In a motor generator welding set having a separate exciter, a supply circuit to the motor generator, a welding circuit supplied by the generator having an electrode and work piece therein, a welding control circuit connected with the welding circuit, a circuit selecting switch for the welding and welding control circuits, means controlled by the application of the electrode to the work for operating the selecting switch to render the welding circuit operative and the control circuit inoperative, and an automatically-operative cut-out circuit for deenergizing the circuit selecting switch in response to the removal of the electrode from the work.

3. In a motor generator welding set having a separate exciter, a supply circuit to the motor generator, a welding circuit supplied by the generator having an electrode and work piece therein, a welding control circuit connected with the welding circuit, a circuit selecting switch for the welding and welding control circuits, means controlled by the application of the electrode to the work for operating the selecting switch to render the welding circuit operative and the control circuit inoperative, a cut-out circuit for the circuit selecting switch, and a time delay device operative to deenergize said cut-out circuit and said circuit selecting switch a predetermined time after the removal of said electrode from said work-piece.

4. In a welder, a welding generator, a welding circuit having a work piece and an electrode, said circuit being normally inoperative, a controlling circuit connected into said welding circuit, a switch adapted to open one of said circuits while closing the other, means actuated by said control circuit responsive to engagement of the electrode with the work for effecting the closure of the welding circuit and the opening of the control circuit, and means separate from the welding circuit for supplying electrical energy to the control circuit.

5. In a welder, a generator and a welding circuit having an electrode and work piece, a control circuit connected in circuit with the electrode and work-piece, means separate from said welding circuit for supplying said control circuit with electrical energy, a common switch for said circuits arranged to close one circuit and concurrently to open the other circuit, means connected with the control circuit when the control circuit is closed by applying the electrode to the work and the welding circuit is open, for closing the welding circuit and opening the control circuit after the electrode has been removed from the work whereby upon reapplication of the electrode to the work the welding operation can be performed.

6. In a welder, a generator and a welding circuit having an electrode and work piece, a control circuit connected in circuit with the electrode and work-piece, means separate from said welding circuit for supplying said control circuit with electrical energy, a common switch for said circuits arranged to close one circuit and concurrently to open the other circuit, means connected with the control circuit when the control circuit is closed by applying the electrode to the work and the welding circuit is open, for closing the welding circuit and opening the control circuit after the electrode has been removed from the work whereby upon reapplication of the electrode to the work the welding operation can be performed, and time-responsive switch means adapted to reopen the welding circuit in the event the electrode is not reapplied to the work for welding within a predetermined time.

7. In a welder, a generator, a welding circuit having an electrode and work-piece therein, a control circuit for controlling the regulation of the welding current, a switch interconnecting said circuits responsive to the contact of the electrode with the work-piece to open one circuit and to close the other circuit, a circuit controlled by the application of the electrode to the work for operating said switch to close the welding circuit and open the control circuit, a welding voltage rheostat circuit selectively controlled by said control circuit; and means responsive to the application of the electrode for a predetermined time interval to the work to close and energize the switch controlling circuit, and means responsive to a reapplication thereof after a predetermined interval of time for an additional predetermined interval of time to energize the voltage controlling circuit for adjusting the generator voltage for the welding circuit, said adjustment being responsive to the interval of time the electrode remains in engagement with the work upon the second application thereof, and means responsive to a second removal of the electrode from the work and a third application thereof to close the welding circuit and render the welding current effective to carry out the welding operation at the voltage desired.

8. In a welder, a welding circuit normally inoperative, a controlling circuit normally operative, a current supply to the controlling circuit separate from the welding circuit, time-responsive switch means responsive to the closing of the welding circuit and its subsequent opening after a predetermined time to render operative the welding circuit and responsive to a further closing of the welding circuit to cause welding to be effected, a switch arranged to close the welding circuit and concurrently to open the control circuit, and a circuit for operating said switch.

9. In a welder, a welding circuit normally inoperative, a controlling circuit normally operative, a current supply to the controlling circuit separate from the welding circuit, time-responsive switch means responsive to the closing of the welding circuit and its subsequent opening after a predetermined time to render operative the welding circuit and responsive to a further closing of the welding circuit to cause welding to be effected, a switch arranged to close the welding circuit and concurrently to open the control circuit, a circuit for operating said switch, and a time delay switch means for disrupting said switch-operating circuit after a predetermined time that the welding circuit is inoperative.

10. In a welder, a welding circuit supplied by a generator and including an electrode and the work, an interconnected control circuit to the welding circuit including the electrode and work, a switch arranged alternately to open the control circuit while closing the welder circuit, a switch operating circuit, a source of electrical energy therefor, a source of electrical energy for the control circuit, a selector operated by the control circuit for controlling the switch operating circuit, and time-responsive switch means for returning said selector to an inoperative position after a predetermined time.

11. In a welder, a welding circuit supplied by a generator and including an electrode and the work, an interconnected control circuit to the welding circuit including the electrode and work, a switch arranged alternately to open the control circuit while closing the welder circuit, a switch operating circuit, a source of electrical energy therefor, a source of electrical energy for the control circuit, a selector operated by the control circuit for controlling the switch operating circuit, time-responsive means for returning said selector to an inoperative position after a predetermined time, and time delay switch means to disrupt said switch circuit to open the welding circuit after a predetermined length of time unless the electrode is brought to the work before the lapse of the time.

12. In a welder, a welding circuit supplied by a generator and including an electrode and the work, an interconnected control circuit to the welding circuit including the electrode and work, a switch arranged alternately to open the control circuit while closing the welder circuit, a switch operating circuit, a source of electrical energy therefor, a source of electrical energy for the control circuit, a selector operated by the control circuit for controlling the switch operating circuit, time-responsive means for returning said selector to an inoperative position after a predetermined time, means to disrupt said switch circuit to open the welding circuit after a predetermined length of time unless the electrode is brought to the work before the lapse of the time, a voltage adjusting circuit for determining the amount of voltage used during welding by the welding circuit, and means for adjusting said voltage adjusting circuit operatively responsive to the energization of the control circuit and the selector through the application of the electrode to the work.

13. In combination, a welding circuit having an electrode and a work piece, an interconnected control circuit separately supplied with electrical energy, a switch arranged alternately to close one circuit while opening the other circuit, and means responsive to the number and period of applications of the electrode to the work-piece and also to the period between the applications for closing the welding circuit while opening the control circuit and for re-opening the welding circuit while closing the control circuit and adjusting the voltage to be used by the welding circuit, and for again closing the welding circuit while opening the control circuit to render the welding current effective for proceeding with the welding operation.

EDWARD A. HOBART.